Nov. 8, 1927. 1,648,643
E. HART ET AL
MEASURING INSTRUMENT
Filed Aug. 25, 1925   3 Sheets-Sheet 2
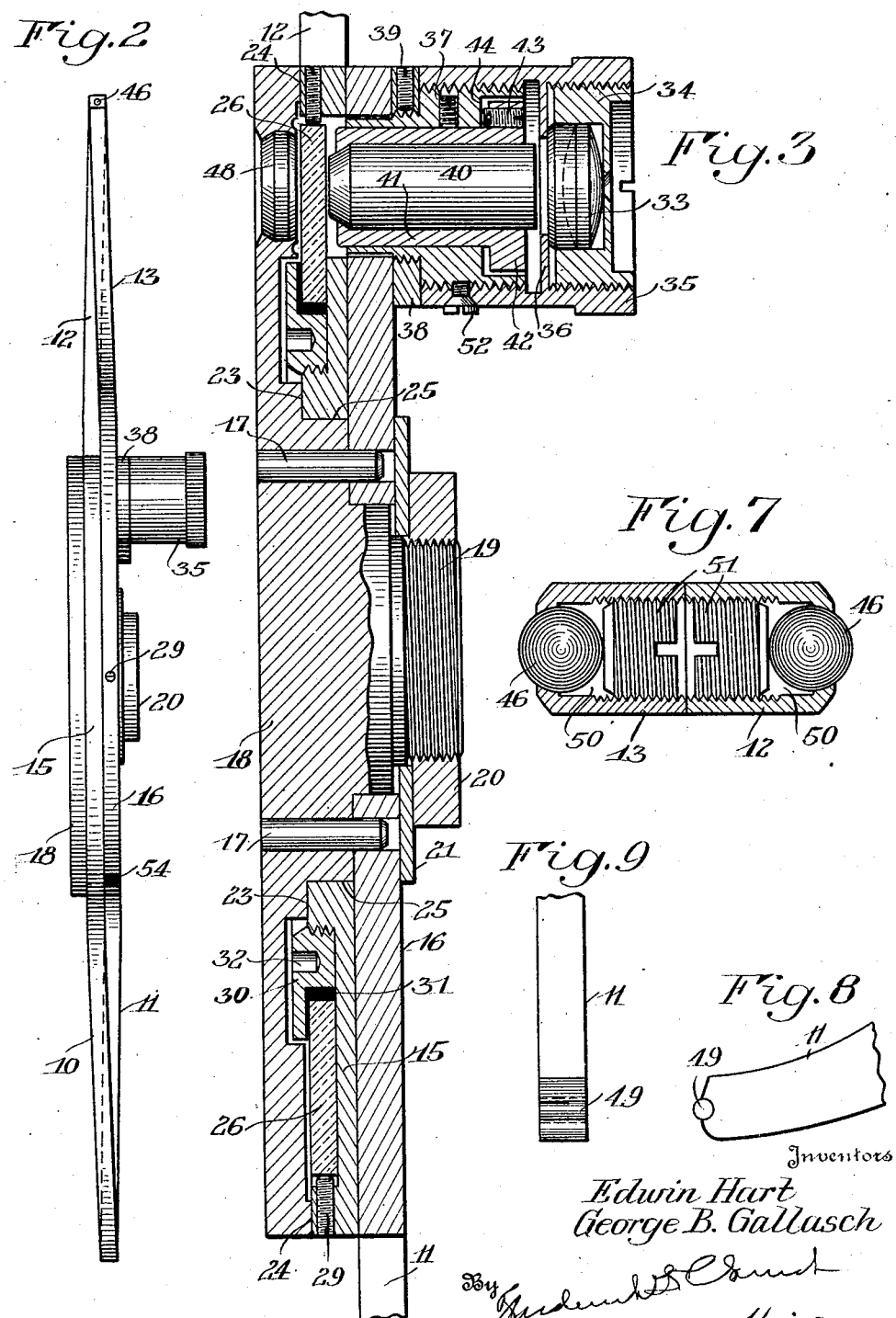
Inventors
Edwin Hart
George B. Gallasch
their Attorney Nov. 8, 1927.
E. HART ET AL
1,648,643
MEASURING INSTRUMENT
Filed Aug. 25, 1925 3 Sheets-Sheet 3
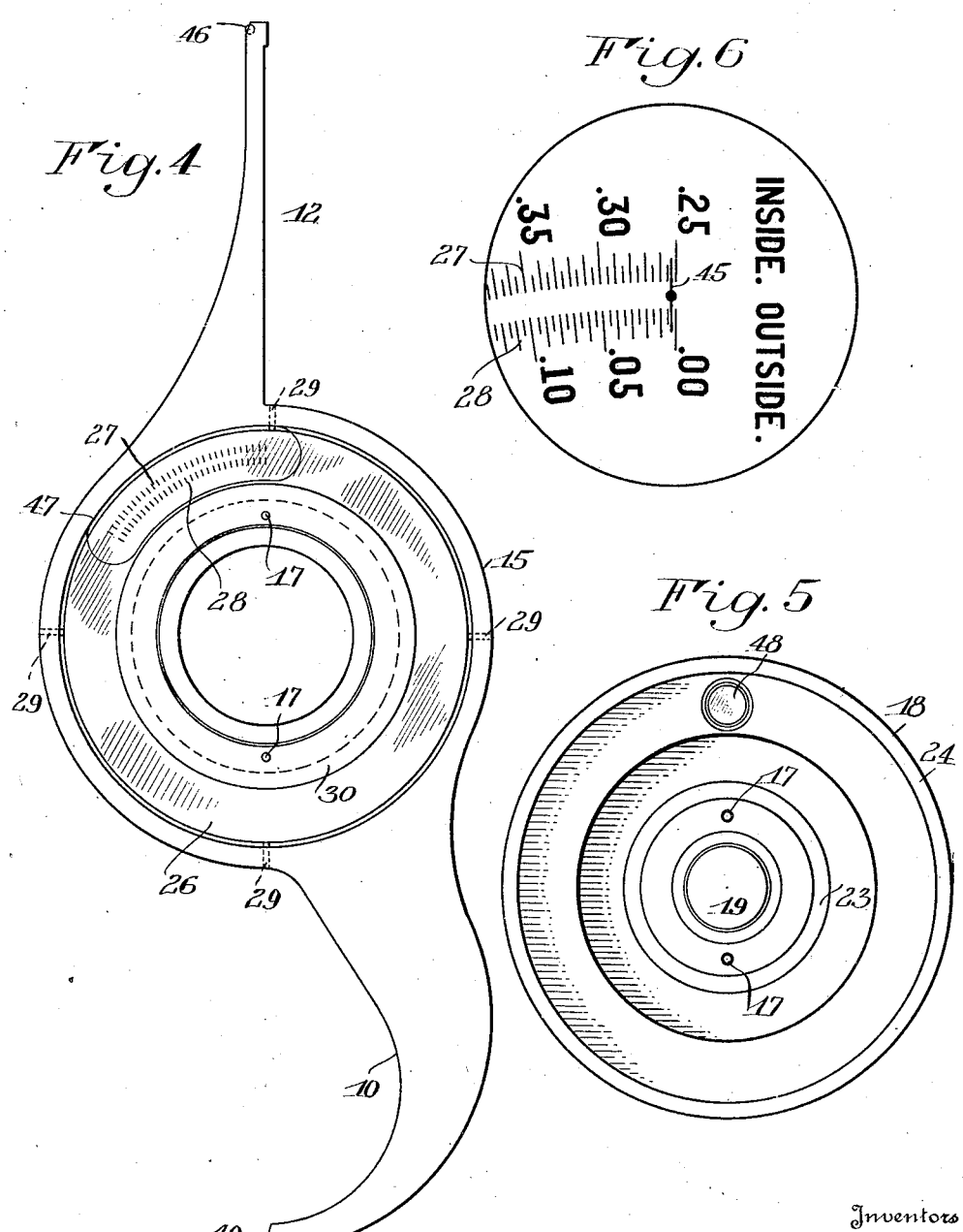

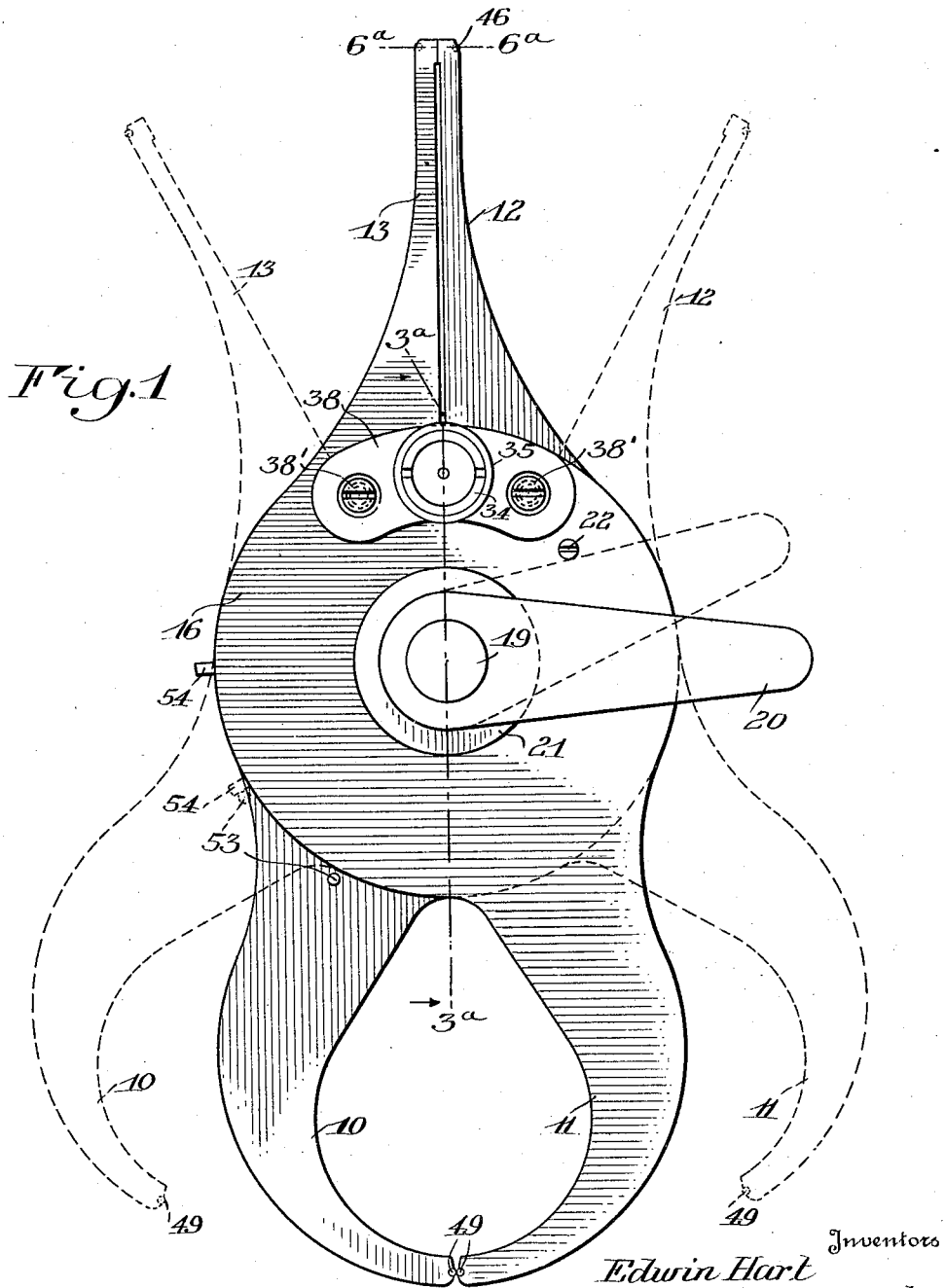

Patented Nov. 8, 1927.

1,648,643

UNITED STATES PATENT OFFICE.

EDWIN HART AND GEORGE B. GALLASCH, OF ROCHESTER, NEW YORK, ASSIGNORS TO BAUSCH & LOMB OPTICAL COMPANY, OF ROCHESTER, NEW YORK, A CORPORATION OF NEW YORK.

MEASURING INSTRUMENT.

Application filed August 25, 1925. Serial No. 52,382.

The present invention relates to measuring instruments and has for its object to provide an improved optical instrument for determining the distance between two points of an object to be measured and embodies contacting portions for engaging the object and improved indicating means by which the results are read directly from the instrument.

The particular form of the invention disclosed embodies a measuring instrument, having relatively movable parts, such as the arms or jaws of a pair of calipers, one of which carries a scale, having any suitable markings thereon, and the other having an index and an objective for viewing the scale, the latter being preferably formed of transparent or translucent material and so disposed that light will be admitted therethrough along the optical axis of the objective, whereby the instrument may be more accurately read particularly under adverse lighting conditions.

A further object of the invention is to provide an improved measuring instrument of the type described embodying enclosed and sealed indicating parts whereby the same are protected against dirt, grease and other foreign substances detrimental to the use of the instrument.

A further object of the invention is to provide a measuring instrument of the character described, embodying a simple form of construction affording a highly efficient instrument, which is both convenient to operate and comparatively inexpensive to manufacture.

To these and other ends the invention resides in certain improvements and combinations of parts, all as will be hereinafter more fully described, the novel features being pointed out in the claims at the end of the specification.

In the drawings:

Figure 1 is a plan view of an instrument embodying one form of the invention.

Figure 2 is a side elevation of the same.

Figure 3 is an enlarged sectional elevation taken on line 3ª—3ª of Figure 1.

Figure 4 is a detailed plan view of the scale carrying section of the instrument.

Figure 5 is a detailed plan of the bearing plate for pivotally supporting one of the movable sections of the instrument.

Figure 6 is an enlarged plan of a portion of the scale as viewed through the eye piece.

Figure 7 is an enlarged sectional view taken on line 6ª—6ª of Figure 1.

Figure 8 is a detailed view drawn to an enlarged scale and illustrating the manner of mounting the cylindrical contacts for the outside caliper jaws, and Figure 9 is a view of the part shown in Figure 8, taken at a different angle.

Similar reference numerals throughout the several views indicate the same parts.

The present invention embodies a measuring instrument adapted particularly for use both as an inside and outside caliper with improved means whereby the different measurements taken from time to time may be readily viewed upon holding the objective of the instrument between the eye and a window or other illuminated area.

It is also particularly advantageous either for inside or outside measurements where the nature of the object to be measured is such that the instrument cannot be withdrawn from measuring position without changing the relative position of the jaws. In cases of this kind with the present instrument, the reading is taken before attempting to withdraw the instrument from contact with the part to be measured. This feature affords a marked improvement over the ordinary type of caliper.

A particular advantage afforded by the use of the optical means disclosed is that relatively large measurements may be taken with but little increase in the diameter of the sections surrounding the pivotal point of the instrument. This is made possible by the use of a relatively small scale adjacent said pivotal point, preferably one having readings not visible to the naked eye, but which are clearly visible through the objective provided, which itself is of relatively small proportions. Thus a ten or twelve inch caliper, or even sizes considerably larger, may have a reduced scale of something like an inch in length, which permits of a relatively small diameter for the scale-carrying portion of the instrument.

Referring to the drawings, 10 and 11 represent the arms or jaws of the outside calipers, while 12 and 13 represent the arms of the inside calipers, arm 12 being integral with arm 10, as shown in Figure 4, and arm 11 integral with arm 13, as indicated in Figure 1. Arms 10 and 12 project from a circular scale carrying section 15 of the instrument and arms 11 and 13 project from a circular section 16, rotatably mounted upon the section 15.

Interlocked with the circular section 16, as by means of the pins 17, is a disc 18, having a screw threaded post 19, carrying a locking member 20, preferably in the form of a lever. The lever engages a washer or clamping ring 21, resting upon the circular portion 16 and by moving the lever substantially to the full line position shown in Figure 1, the sections 15 and 16 will be clamped by the disc 18 against relative movement. When the lever is in the dotted line position shown in Figure 1 or against the stop pin 22, the sections are free to rotate, one upon another. The disc 18 has inner and outer annular shoulders 23 and 24 and a bearing portion 25 upon which the section 15 is adapted to rotate in addition to its bearing upon the inner face of the section 16. The bearing 25 is relatively large and insures proper alinement of the parts.

The annular section 15 is recessed to receive the transparent scale carrying ring 26, shown in section Figure 3, and in plan Figure 4. The scales for the inner and outer calipers are indicated respectively at 27 and 28, each preferably being in the form of a decimal scale, as shown in Figure 6. The markings may be produced by any suitable method and the scale, if preferred, may either be in inches or millimeters.

The annular recess formed in the section 15 is larger than the scale ring in order to permit the latter to be properly centered with respect to the pivotal axis of the instrument. This is preferably done by a series of radially disposed adjusting screws 29, projecting into and engaging the outer periphery of the scale ring, as shown in Figures 3 and 4. After the scale ring has been properly centered, a clamping ring 30 therefor is screwed into position upon the annular section 15, as shown in Figure 3. A filler 31, preferably cement or other adhesive material is interposed between the scale and clamping ring which when hardened forms a suitable binder between said parts. Rotation of the clamping ring 30 into retaining position is preferably affected by a suitable tool, having projections adapted to be inserted in the recesses 32 of the ring.

The objective or eye piece for reading the scale is provided with a suitable magnifying lens 33, disposed in a holder 34 threaded in a casing 35 having an inwardly extending flange 36, upon which the lens is adapted to rest, as shown in Figure 3. The casing 35 is screw threaded upon a tube or mount 37 which in turn is threadedly connected with a base plate 38, having a screw 39 for locking the mount in properly adjusted position, the base plate being secured by screws 38'. A glass rod 40 is interposed between the lens and the scale and is carried in a sleeve 41 disposed within the mount 37 and has a flange 42 provided with an adjusting screw 43, adapted to rest upon a shoulder 44 of the mount, to permit the bottom of the glass rod to be accurately adjusted into close proximity to the scale plate 26, as shown in Figure 3. The bottom of the rod has formed thereon a suitable index 45 for both scales, as shown in Figure 6. It is also preferably provided with the words "Inside" and "Outside," disposed respectively at points opposite the scales for the inside and outside calipers.

With the instrument closed, as indicated by full lines in Figure 1, the index mark 45 will be in registry with the zero point of the scale 28 for the outside caliper. However, for the inside caliper the distance between the contact points 46 thereof has to be taken into account, and this in the present case being preferably made equal to one-quarter of an inch, the scale for the inside calipers has been marked accordingly as shown in Figure 6. For example, if the actual distance between the two points to be measured is .35 of an inch the index line will coincide with a line on the scale corresponding to this dimension.

In the present construction, the scale plate 26 is entirely enclosed and sealed so that no dust or dirt can accumulate thereon to interfere with the readings. Likewise the inner end of the glass rod carrying the index is protected against the accumulation of dust or dirt. The rod serves as a sealing member for the mount and should any dust or foreign particles accumulate on its outer end they may be easily wiped off upon removing the lens holder 34.

Light is admitted to the transparent scale plate through an opening 47 in the annular portion of the scale carrying section 15 and through a window embodying a glass plate 48 in the disc or clamping ring 18, the window being located in registry with the eye piece. The index is adapted to register with the zero point when the contact points 49 of the outside calipers are in engagement as shown in Figure 1. These contacts are preferably in the form of hardened cylinders forced into recesses formed in the ends of the arms 10 and 11 under pressure and when worn may be driven out and turned so as to again afford the proper readings, or if desired they may be replaced with new contacts from time to time.

The contacts 46 for the inside calipers are preferably in the form of hardened steel balls and are mounted in recesses 50 formed in the ends of arms 12 and 13 and held in position by the screw plugs 51 as shown in Figure 7. When the surfaces of the balls which contact with the objects to be measured become worn the plugs may be loosened and the balls turned in their bearings so that the correct distance will be afforded between the outer faces of the balls.

The lens 33 may be properly focused by adjustment of the casing 35 on the mount 37, since relatively coarse threads are provided between said parts, one of the threads being cut away for a portion of its circumference to form a groove for the reception of a limiting screw 52 adapted to engage a shoulder on the mount 37 at the end of the groove to limit the outward movement of the casing 35.

The extent to which the calipers may be opened is preferably limited by a pair of angularly disposed stop pins 53 and 54, the former projecting from the arm 10, and the latter from the annular portion 16 of the objective-carrying section of the instrument.

The eye piece may be readily adjusted to bring the index into registery with the zero mark since the heads and shanks of the screws 38' in the base plate 38 lie within openings formed therein having greater diameters than those of the heads and shanks, it being understood that the screws are threaded into the annular section 16 upon which the eye piece is mounted.

While the present disclosure embodies both inside and outside calipers in one instrument, it will be understood that both forms may be separately embodied in a single instrument, if desired, without departing from the principles of the invention.

We claim as our invention:

1. In a measuring instrument, the combination with a pair of adjustably connected members adapted for engagement with an object to be measured, of a scale carried by one of said members and an objective carried by the other member and being adjustable along an axis extending transverse to the scale, and adapted to form an image of the scale in all positions of the members within pre-determined limits and an index on the objective-carrying member.

2. In a measuring instrument, the combination with a pair of pivotally connected arms adapted for engagement with an object to be measured, of a transparent member carried by one of the arms having a scale formed thereon and ocular means carried by the other arm having an index associated therewith, the scale being illuminated by light admitted through the transparent member.

3. In a measuring instrument, the combination with a pair of pivotally connected arms adapted for engagement with an object to be measured, of a transparent scale disposed on one of the arms the latter having an opening for admitting light to the scale, means for securing the scale upon said arm, an eye piece carried by the other arm through which the scale is adapted to be viewed and an index visible through the eye piece, relative to which the scale is adapted to move.

4. In a measuring instrument, the combination with a pair of pivotally connected arms adapted for engagement with an object to be measured, a plate spaced from and connected with one of the arms and forming retaining means for the other arm, a transparent plate carried by the last mentioned arm having a scale thereon, an eye piece carried by the other arm having an index associated with the scale, and a window in the retaining plate for admitting light to the scale.

5. In a measuring instrument, the combination with a pair of pivotally connected arms adapted for engagement with an object to be measured, a plate carried by one of said arms having a scale thereon, and an objective disposed in registry with the scale including a lens and a transparent member interposed between the scale and the lens of the objective and having an index overlying the scale.

6. In a measuring instrument, a combination with a pair of pivotally connected arms adapted for engagement with an object to be measured, a transparent plate disposed over a light-admitting opening in one of the arms and having a scale thereon, means for securing said plate to said arm, a lens tube disposed upon the other arm in registry with the scale, a magnifying lens carried by said tube, and a glass rod disposed within the tube between the lens and the scale and having an index overlying the scale.

7. In combination, a measuring instrument embodying a pair of arms having oppositely disposed annular hub portions provided with registering openings, a disc engaging one of said annular portions and having a pivot post projecting through said openings and forming a pivot for one of the arms, a member threaded upon said post and forming locking means for securing the arms in different positions of adjustment, a scale holding plate carried by an annular portion of one of the arms, an objective including a lens carried by the annular portion of the other arm through which the scale is adapted to be viewed, and an index interposed between the scale and the lens of the objective.

8. In a measuring instrument, the combination with a pair of adjustably connected members adapted for engagement with an object to be measured, of a scale holding plate enclosed by said members, one of which has a light admitting opening opposite the plate and an objective carried by the other member adapted to form an image of the scale in all positions of the members within predetermined limits, and an index on the objective carrying member.

9. In a measuring instrument, the combination with a pair of adjustably connected members for engagement with an object to be measured, of a transparent element carried by one of said members having a scale thereon, a magnifying lens carried by the other member and a light transmitting element between the lens and said element having an index thereon.

10. In a measuring instrument, the combination of a pair of pivotally connected arms one of which is provided with an opening, a transparent member aligned with the opening and having a scale thereon, a magnifying lens carried by the other arm opposite said opening and an index disposed between said lens and transparent member.

11. In a measuring instrument, the combination of a pair of pivotally connected arms one of which is provided with an opening, a transparent member carried by the last mentioned arm in alignment with the opening and having a scale thereon, a magnifying lens carried by the other arm opposite said opening, and a light transmitting element disposed between said lens and transparent member and having an index thereon.

12. In a measuring instrument, the combination of a disc, a pair of relatively movable arms, one of which is fixed to the disc and the other pivoted upon the disc, a transparent member enclosed between said disc and one of said arms and having a scale thereon, the disc having an opening for admitting light to the said transparent member, a magnifying lens disposed opposite an opening in the other arm in registry with the first mentioned opening and a light transmitting element closing the second mentioned opening and having an index thereon for cooperation with said scale.

13. In a measuring instrument, the combination of a disc, a pair of relatively movable arms, one of which is fixed to the disc and the other pivoted thereon, a transparent member enclosed between said disc and one of said arms and having a scale thereon, the disc having an opening for admitting light to said transparent member, a light transmitting element closing said opening, a magnifying lens disposed opposite an opening in the other arm in registry with the first mentioned opening and a glass rod between said lens and transparent member, serving to close the second mentioned opening and having an index thereon for cooperation with said scale.

14. In a measuring instrument, the combination with a pair of arms having pivotally connected circular hub portions, of means for indicating the degree of movement of one arm relative to the other including a plate mounted upon one of said hub portions and having a scale thereon and an eye-piece upon the other hub portion for viewing the scale.

15. In a measuring instrument, in combination, a disc, a pair of arms having circular hub portions, one of which is fixed to said disc and the other pivoted thereon and means for indicating the degree of movement of one arm relative to the other including a scale disposed between said disc and one of said hub portions and an eye-piece carried by the other hub portion.

16. In a measuring instrument, the combination of a pair of pivotally connected arms having circular hub portions, one of which is provided with a circular recess and the other with an opening, an eye-piece including an index, said eye-piece being adapted to form a seal for said opening, a transparent plate disposed within said recess having a scale thereon and a closure for said recess having an opening in registry with the first mentioned opening for admitting light to the scale.

17. In a measuring instrument, in combination, a disc having a bearing formed thereon, an arm having a circular portion rotatable upon said bearing and having an annular recess formed therein, a transparent ring disposed within said recess, means for centering the ring with respect to the axis of the disc, a second arm having a circular portion fixed to the disc and overlying the circular portion of the first mentioned arm and having an opening in registry with said ring, an eye-piece including a magnifying lens and a glass rod between the lens and scale plate having an index thereon and a light transmitting element disposed in an opening formed in the disc opposite said scale plate.

EDWIN HART.
GEORGE B. GALLASCH.